US012230878B2

(12) United States Patent
Samardzija et al.

(10) Patent No.: US 12,230,878 B2
(45) Date of Patent: Feb. 18, 2025

(54) HIGHLY ISOLATED AND BARELY SEPARATED ANTENNAS INTEGRATED WITH NOISE FREE RF-TRANSPARENT PRINTED CIRCUIT BOARD (PCB) FOR ENHANCED RADIATED SENSITIVITY

(71) Applicant: Plume Design, Inc., Palo Alto, CA (US)

(72) Inventors: Miroslav Samardzija, Mountain View, CA (US); Yun-Ping Huang, Santa Clara, CA (US); Brian Nam, San Jose, CA (US); Liem Hieu Dinh Vo, San Jose, CA (US)

(73) Assignee: PLUME DESIGN, INC., Palo Alto, CA (US)

(*) Notice: Subject to any disclaimer, the term of this patent is extended or adjusted under 35 U.S.C. 154(b) by 150 days.

(21) Appl. No.: 17/857,377

(22) Filed: Jul. 5, 2022

(65) Prior Publication Data

US 2024/0014548 A1 Jan. 11, 2024

(51) Int. Cl.
*H01Q 1/52* (2006.01)
*H01Q 1/48* (2006.01)
(Continued)

(52) U.S. Cl.
CPC ................. *H01Q 1/52* (2013.01); *H01Q 1/48* (2013.01); *H01Q 9/0421* (2013.01); *H01Q 9/42* (2013.01)

(58) Field of Classification Search
CPC .......... H01Q 1/52; H01Q 1/48; H01Q 9/0421; H01Q 9/42
See application file for complete search history.

(56) References Cited

U.S. PATENT DOCUMENTS 6,426,723 B1 * 7/2002 Smith ...................... H01Q 1/24 343/893
6,853,197 B1 2/2005 McFarland et al.
(Continued)

FOREIGN PATENT DOCUMENTS

CN 112751160 A * 5/2021 ............. H01Q 1/242
JP 2011250108 A * 12/2011 ............... H01Q 1/22
(Continued)

OTHER PUBLICATIONS

International Search Report and Written Opinion to corresponding International Application No. PCT/US23/68929 mailed Sep. 28, 2023 (16 pages).

*Primary Examiner* — Hai V Tran
*Assistant Examiner* — Bamidele A Immanuel
(74) *Attorney, Agent, or Firm* — Nicholas Martin; Greenberg Traurig, LLP

(57) ABSTRACT

Two antennas based on quarter wave elements angled relative to each other and connected to two ground planes that are also angled relative to one another, having a shorting connection to cancel the extra capacitance and the antennas form a structure similar to IFA or PIFA. The two antennas fed from alternate ends and spaced closely together in which the connection of each antenna to ground causes the ground plane connections to be electrically far apart. A method of manufacturing an antenna system comprising antenna feeds which are connected via a spring pin and a ground pin that is formed partially by a screw connection, spring clip, or spring pin. The antenna elements are stamped and printed on a single non-conducting surface and the antenna carrier is connected to a circuit board that contains the active electronics.

18 Claims, 12 Drawing Sheets

(51) Int. Cl.
*H01Q 9/04* (2006.01)
*H01Q 9/42* (2006.01)

(56) References Cited

U.S. PATENT DOCUMENTS 6,961,545 B2 11/2005 Tehrani et al.
7,245,882 B1 7/2007 McFarland
7,245,893 B1 7/2007 Husted et al.
7,251,459 B2 7/2007 McFarland et al.
8,552,913 B2 * 10/2013 Ayatollahi ............... H01Q 9/42 343/702
9,136,937 B1 9/2015 Cheng et al.
9,160,584 B1 10/2015 Kavousian et al.
10,522,915 B2 * 12/2019 Kenkel ................ H01Q 9/0414
10,854,974 B2 * 12/2020 Oh .......................... H01Q 1/44
2003/0193437 A1 * 10/2003 Kangasvieri ......... H01Q 9/0421 343/702
2004/0066341 A1 * 4/2004 Ito .......................... H01Q 21/24 343/702
2005/0184914 A1 * 8/2005 Ollikainen ............... H04B 7/10 343/702
2007/0120740 A1 5/2007 Lellici et al.
2008/0007468 A1 * 1/2008 Sato ....................... H01Q 1/243 343/702
2009/0256754 A1 * 10/2009 Tsai ....................... H01Q 25/00 343/700 MS
2010/0231460 A1 9/2010 Chiang et al.
2011/0205138 A1 * 8/2011 Yanagi ..................... H01Q 9/42 343/845
2011/0298666 A1 * 12/2011 Kim ....................... H01Q 21/28 343/700 MS
2013/0069841 A1 * 3/2013 Lee ........................ H01Q 21/28 343/893
2013/0076576 A1 * 3/2013 Avendal ................. H01Q 1/243 343/702
2013/0090057 A1 4/2013 Green et al.
2013/0229318 A1 * 9/2013 Ng .......................... H01Q 5/30 343/770
2013/0293424 A1 11/2013 Zhu et al.
2014/0009344 A1 1/2014 Zhu et al.
2014/0009355 A1 1/2014 Samardzija et al.
2014/0112511 A1 * 4/2014 Corbin ................... H05K 9/006 343/702
2014/0226572 A1 8/2014 Thota et al.
2014/0340265 A1 11/2014 Vazquez et al.
2014/0368405 A1 * 12/2014 Ek .......................... H01Q 5/371 343/893
2014/0375526 A1 * 12/2014 Ziv ...................... H01Q 9/0421 343/893
2015/0099474 A1 * 4/2015 Yarga .................. H01Q 1/2266 455/77
2015/0109167 A1 4/2015 Yarga et al.
2015/0195836 A1 7/2015 Malkin et al.
2015/0270606 A1 * 9/2015 Chang ...................... H01Q 9/42 343/848
2015/0302976 A1 10/2015 Chang et al.
2015/0303568 A1 10/2015 Yarga et al.
2015/0311960 A1 10/2015 Samardzija et al.
2015/0338523 A1 * 11/2015 Rajagopalan .......... H01Q 1/243 342/357.77
2016/0056526 A1 2/2016 Li et al.
2016/0111794 A1 * 4/2016 Yang ...................... H01Q 21/28 343/893
2016/0164169 A1 * 6/2016 Krogerus ............... H01Q 21/28 343/702
2016/0301145 A1 * 10/2016 Lee ........................ H01Q 1/521
2016/0336643 A1 * 11/2016 Pascolini ............. H01Q 9/0421
2017/0207546 A1 * 7/2017 Benzel ................... H01Q 15/14
2018/0269571 A1 * 9/2018 Hiraiwa ................... H01Q 1/48
2018/0351235 A1 * 12/2018 Wang ..................... H01Q 21/28
2019/0069788 A1 3/2019 Coleman et al.
2020/0136689 A1 * 4/2020 Bisiules ................. H01Q 21/08

FOREIGN PATENT DOCUMENTS

JP 2013093645 A * 5/2013 ............. H01Q 19/17
JP 2015111763 A * 6/2015 ............. H01Q 21/24

* cited by examiner

| antenna length | antenna separation | antenna pair length | antenna pair height | antenna pair area |
|---|---|---|---|---|
| λ/4 (0.25λ) | λ/2 (0.5λ) | λ/2 (0.5λ) | λ/4 (0.25λ) | $\lambda^2/8$ ($0.125\lambda^2$) |

900

HIGHLY ISOLATED AND BARELY SEPARATED ANTENNAS INTEGRATED WITH NOISE FREE RF-TRANSPARENT PRINTED CIRCUIT BOARD (PCB) FOR ENHANCED RADIATED SENSITIVITY

FIELD OF THE DISCLOSURE

The present disclosure generally relates to antenna systems and methods. More specifically, the present disclosure relates to highly isolated and barely separated antennas in a wireless device, integrated with noise free radiofrequency (RF) transparent Printed Circuit Board (PCB) for enhanced radiated sensitivity.

BACKGROUND OF THE DISCLOSURE

Various devices utilize antennas for wireless communication, such as wireless Access Points (APs), streaming media devices, laptops, mobile phones, tablets, and the like (collectively "wireless devices"). Recently, the demand for antennas for mobile wireless applications has increased dramatically, and there are a number of applications for wireless communications that require a wide range of frequency bands. When two or more antennas are designed for same/similar frequency bands coupling between the multiple antennas becomes one of the most important design metrics. Coupling describes when radiation is absorbed by one antenna receiver when another nearby antenna is operating. Coupling occurs when two or more antennas are placed in such close physical proximity to one another that the radiation is unintendedly absorbed by the antenna close to the transmitting antenna. Low coupling (high isolation) is desired to not degrade antenna efficiency, diversity, and/or Multiple-Input Multiple-Output (MIMO). Antenna diversity is a wireless scheme that uses two or more antennas to improve the quality and reliability of a wireless link. MIMO is a method for multiplying the capacity of a radio link by using multiple transmission and receiving antennas to transfer data at the same time. Both diversity and MIMO require high isolation and are standard protocols in Wi-Fi and cellular technologies. It should be noted that antenna elements must be physically dimensioned to match the operating wavelength, and antenna size is inversely proportional to frequency, therefore the lower the operational frequency the larger the antenna that is required to operate at that frequency. Typical Wi-Fi frequency bands are 2.4 GHz and 5 GHz, in comparison cellular LTE AT&T Band 17 and Verizon Band 13 both operate in the 700 MHz range. As antennas are being employed in more compact forms with reduced physical separation, the need for high isolation between the two or more antennas radiating elements as well as limiting the overall length and height of the antenna pair system is necessary. Many different types of resonant antennas exist including but not limited to dipole, monopole, array, and loop. Monopole antennas are half the size of dipole antennas and are commonly a straight antenna that is mounted perpendicular to a ground plane. Quarter wavelength ($\lambda/4$) antennas are commonly used in small form devices as the antenna is much smaller but also provides similar transmission and reception efficiency compared to the half or full wavelength antennas. A ground plane is included to combine with the antenna to form a complete resonant circuit at the desired operational frequency, where the ground plane is used as the return path. Quarter wavelength antennas require special attention to antenna length, antenna feed, and the shape and size of the ground plane and return path, when implemented into a small form device these parameters are of great significance.

BRIEF SUMMARY OF THE DISCLOSURE

The present disclosure includes a method for reducing the physical separation of two or more antennas for wireless communication and achieving high isolation between the two or more antennas. High isolation between the two or more antennas is necessary to not degrade efficiency, diversity, and/or MIMO. In an example application, the antennas can be used in a compact electronic device that supports Wi-Fi, Bluetooth, and cellular connectivity.

In an embodiment, a compact electronic device includes a housing; circuitry; and a first antenna and a second antenna, connected to the circuitry, contained in the housing, wherein each of the first antenna and the second antenna are angled relative to one another with one end of each spaced physically close, and wherein each of the first antenna and the second antenna are connected to corresponding ground planes that are also angled relative to one another. Positioning of the first antenna and the second antenna angled relative to one another and the ground planes angled relative to one another causes ground plane connections to be electrically far apart. The first antenna and the second antenna can be driven in from alternating ends causing a high field portion of one antenna to be close to a drive/high current portion of the other antenna, thereby providing high separation of the two high field areas and two high current areas. One or both the first antenna and the second antenna can have a shorting connection to cancel extra capacitance.

The first antenna and the second antenna can have an antenna structure similar to IFA or PIFA. One or more of the first antenna and the second antenna can have a multidimensional structure. The first antenna and the second antenna can each be fed via a spring pin. The first antenna and the second antenna can each include a ground pin formed by any of a screw, spring clip, and spring pin. The circuitry can be on a printed circuit board having a ground plane removed in part to allow radiation from the first antenna and the second antenna. The circuitry can be on a printed circuit board that utilizes the ground planes. The first antenna and the second antenna can be each located on adjacent sides of the housing from one another, and the compact electronic device can include one or more additional antennas located on opposite sides of the housing from the adjacent sides. The first antenna and the second antenna can be cellular antennas and the one or more additional antennas can be for any of Wi-Fi and Bluetooth.

In another embodiment, a compact electronic device is formed by a process with steps of forming a first antenna and a second antenna; connecting the first antenna and the second antenna to circuitry; connecting the first antenna and the second antenna to ground planes placing the first antenna and the second antenna and the circuitry in a housing such that each of the first antenna and the second antenna are angled relative to one another with one end of each spaced physically close, and wherein the ground planes are also angled relative to one another.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to highly isolated and barely separated antennas in a wireless device, integrated with noise free RF-transparent PCB for enhanced radiated sensitivity. In an example application, the antennas can be used in a compact electronic device that supports Wi-Fi, Bluetooth, and cellular connectivity.

Antenna System Separation and Arrangement

Figure 1:
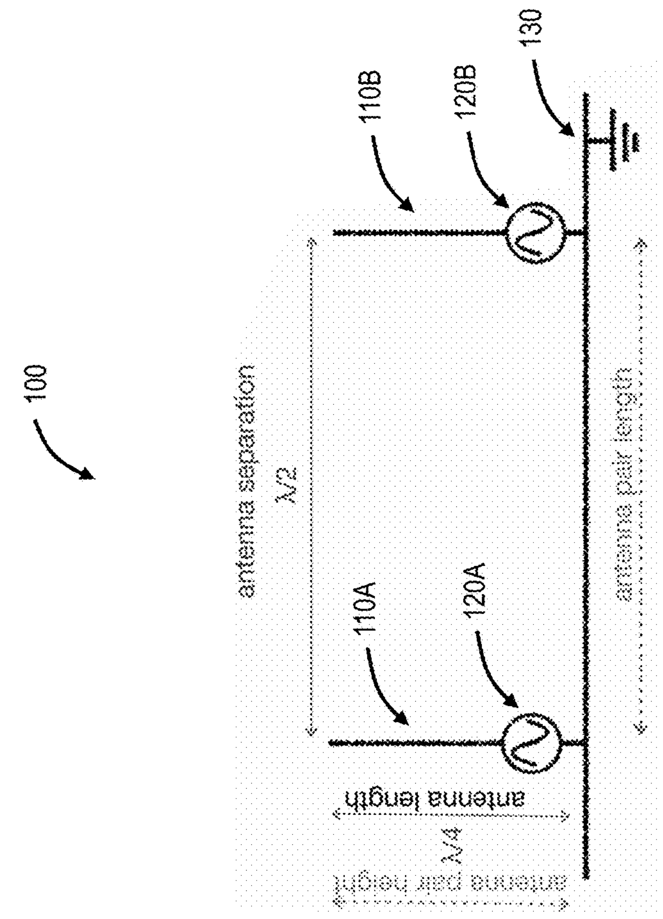
FIG. 1 is a circuit diagram of a typical multi-antenna system including two monopole antennas.

FIG. 1 is a circuit diagram of a multi-antenna system 100 showing two quarter wavelength monopole antennas (110A and 110B) separated by λ/2. It should be noted that λ/2 is a typical separation where A is the wavelength at the lowest frequency of operation. For instance, LTE AT&T Band 17 and Verizon Band 13 both operate in the 700 MHz range, therefore when the lowest frequency of operation is 700 MHz [c/frequency, where c is the speed of light (299,792, 758 m/s). λ=428 mm, the separation between the two antennas would then be λ/2=214 mm]. This circuit diagram is an example of a multi-antenna design that can be described in more detail as including two vertical or monopole antennas (110A and 110B) where both monopole antennas have λ/4 length and includes a common ground plane 130 where the ground plane acts to reflect the radio waves and represent a resonant circuit. The monopole antenna is a class of radio antenna including a straight conductor often mounted perpendicular over a ground plane as shown. The ground plane 130 size influences the gain, resonance frequency, and impedance of the antenna. The ground plane 130 is typically a flat horizontal conducting service arranged perpendicular to the monopole antennas (110A and 110B) and is typically connected to electrical ground. The antenna feeds (120A and 120B) represent the components which connect the transmitter and/or receiver with the antenna and are located between the lower end of the monopole and the ground plane 130. It should be noted that in the two-monopole antenna 100, the antenna pair length is equal to the antenna separation of λ/2. In this example if degraded isolation and diversity/MIMO is acceptable the separation between antennas could be reduced to less than λ/2 but the general rule is to not reduce separation less than λ/4. The antenna pair area is calculated by antenna pair length multiplied by antenna pair height. It should be noted that detailed aspects of these antenna types may be omitted from this illustration as it is intended to depict the antenna arrangement and the effect of the arrangement on the antenna pair height, antenna pair length, antenna separation, and antenna pair area. This conventional antenna design will be used as a benchmark to compare the design aspects of the present disclosure.

Figure 2:
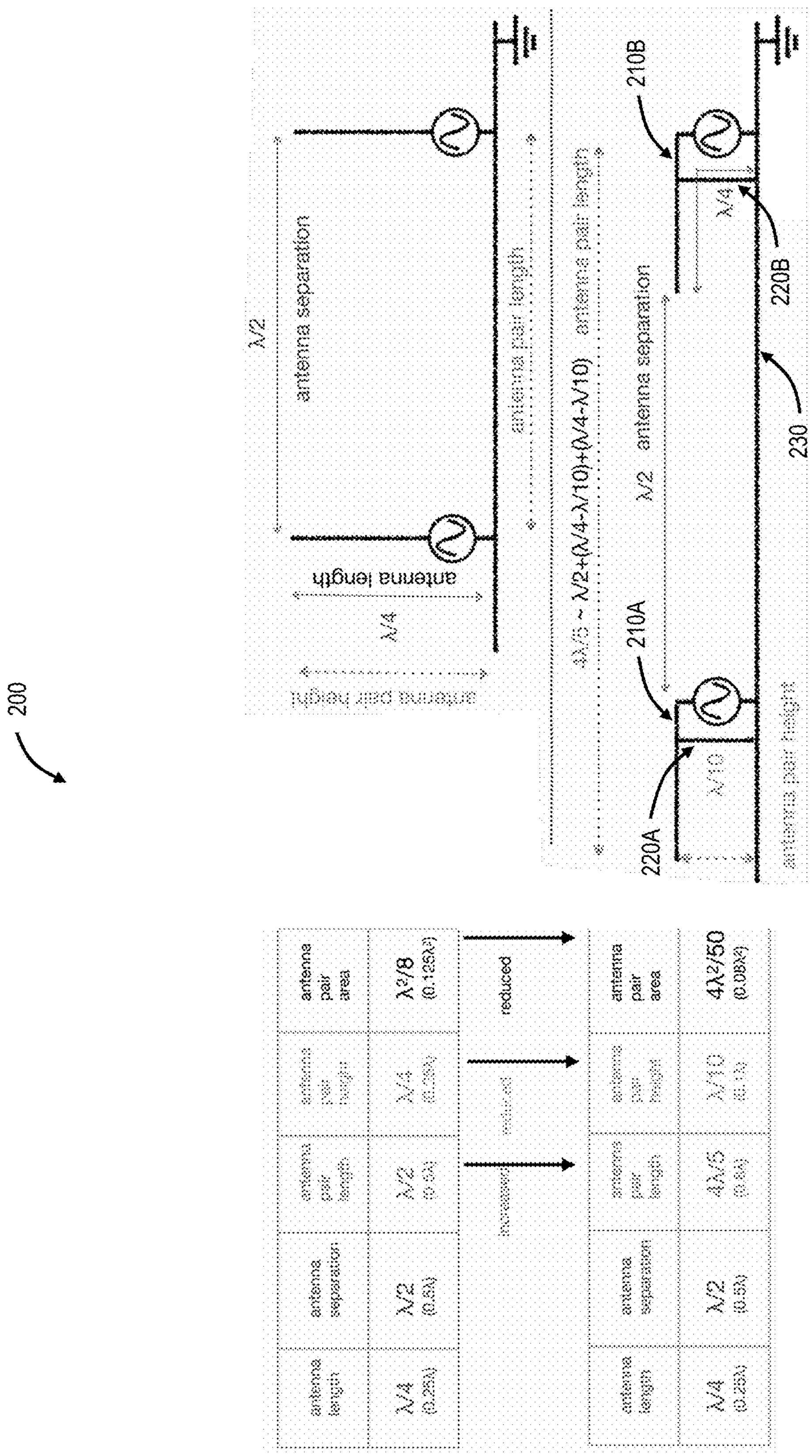
FIG. 2 is a circuit diagram of a typical multi-antenna system including two Inverted F/Planar Inverted F antennas (IFA/PIFAs).

FIG. 2 is a typical circuit diagram of a multi-antenna system 200 showing two Inverted F/Planar Inverted F antennas (IFA/PIFAs) (210A and 210B) and comparison between the IFA/PIFA to the monopole antenna type as shown in FIG. 1. It should be noted that detailed aspects of these antenna types may be omitted from this illustration as it is intended to depict the antenna arrangement and the effect of the arrangement on the antenna pair height, antenna pair length, antenna separation, and antenna pair area. IFA/PIFAs include a monopole antenna running parallel to a ground plane 230, grounded at one end in the shape of an inverted F. The IFA/PIFA antenna arrangement includes a bent antenna which capacitively couples to the ground plane, therefore a shorting connection (short pin) is included between the antenna and ground (220A and 220B) which acts as a parallel inductance. The IFA/PIFA antenna type allows a reduced antenna pair height advantage over the two-monopole configuration described in FIG. 1, from a height of λ/4 to a typical pair height of λ/10 as shown in 210A, 210B. As such, the IFA/PIFAs also have a reduced antenna pair area (antenna pair height×antenna pair length) when compared to the two-monopole configuration. The antenna pair length of the IFA/PIFAs are longer than that of a monopole configuration based on the inverted F arrangement (the IFA/PIFAs pair length is 4λ/5 where the monopole configuration in FIG. 1 has a pair length of λ/2). The IFA/PIFA configuration has the advantage of having a reduced antenna pair height and antenna pair area but has the disadvantage of having an increased antenna pair length compared to the two-monopole antenna type. The challenge that is realized when designing a multi-antenna system in a small form factor is two-fold:

a. The need to reduce the antenna separation in order to place the multi-antenna system in a small form without degrading high isolation (low coupling) between the antennas.
b. Reduce the overall antenna pair length and antenna pair area in order to accommodate the small form.

Figure 3:
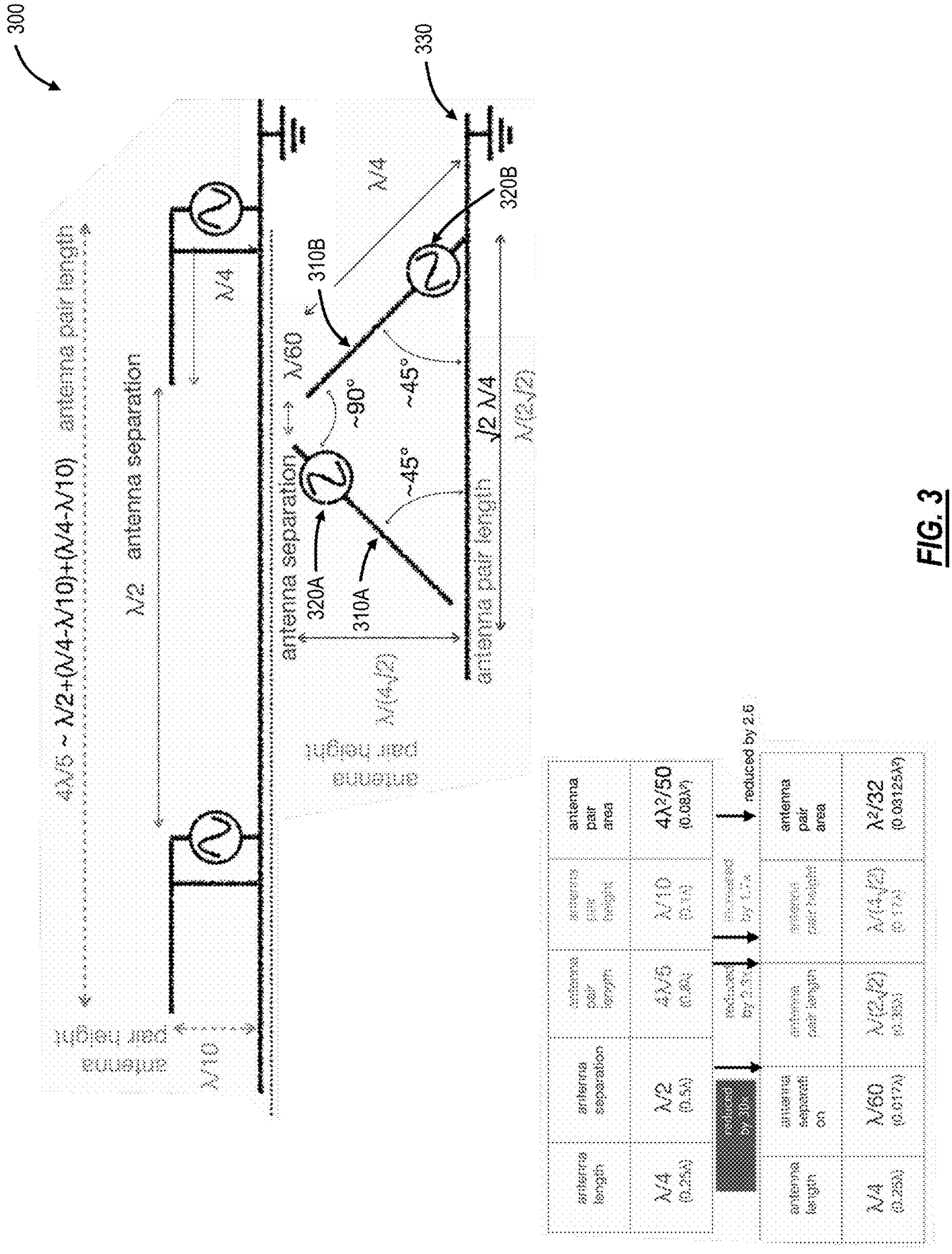
FIG. 3 is a circuit diagram of a multi-antenna system including two λ/4 monopole antennas arranged in a 45-45-90-degree triangle arrangement as described in the claims.

FIG. 3 is a circuit diagram depicting a multi-antenna system including two λ/4 monopole antennas (310A and 310B) arranged in a 45-45-90-degree triangle arrangement 300 and a comparison to the IFA/PIFA arrangement shown in FIG. 2. It should be noted that detailed aspects of this arrangement may be omitted from this illustration as it is intended to depict the antenna arrangement and the effect of the arrangement on the antenna pair height, antenna pair length, antenna separation, and antenna pair area. The antenna 310B is arranged in an approx. 45-degree angle in relation to the horizontal ground plane (330) and fed from the same side (320B) compared to the vertical monopole in FIG. 1. The antenna 310A is arranged in an approx. 45-degree angle in relation to the horizontal ground plan (330) but is fed from the opposite side (320A) as compared to the monopole and IFA/PIFA. The difference in angle between the two antennas is 90 degrees. By arranging the same λ/4 monopole antennas (310A and 310B) as previously shown in the IFA/PIFA conventional arrangements of FIG. 2 in this triangle arrangement the antenna pair length is reduced by 2.3 times that of the IFA/PIFA. Even though the triangle arrangement increased the antenna pair height by 1.7 times compared to the IFPA/PIFA, further observation is made that a reduction in antenna pair area is achieved compared to the IFA/PIFA from 0.08 $\lambda^2$ to 0.03125 $\lambda^2$ which is a reduction of 2.6 times compared to the IFA/PIFA. Considering the feeds to the two antennas now are in opposing sides the antenna separation is also greatly reduced while maintaining low coupling which is shown as a 30 times reduction as compared to the separation of the IFA/PIFA shown in FIG. 2. The reduction in separation is due to the fact that the two antennas are being fed and excited from opposite ends. This arrangement provides a great advantage over conventional antenna arrangements as it reduces the antenna pair length, antenna pair area, and at the same time significantly reducing antenna separation. The result is an antenna system with a smaller physical form while also providing antenna separation that will reduce antenna coupling compared to conventional antenna designs. It should be noted that this circuit diagram omitted the feed connection for 310A, this feed connection, and any additional pins are described in further figures in the disclosure.

Figure 4:
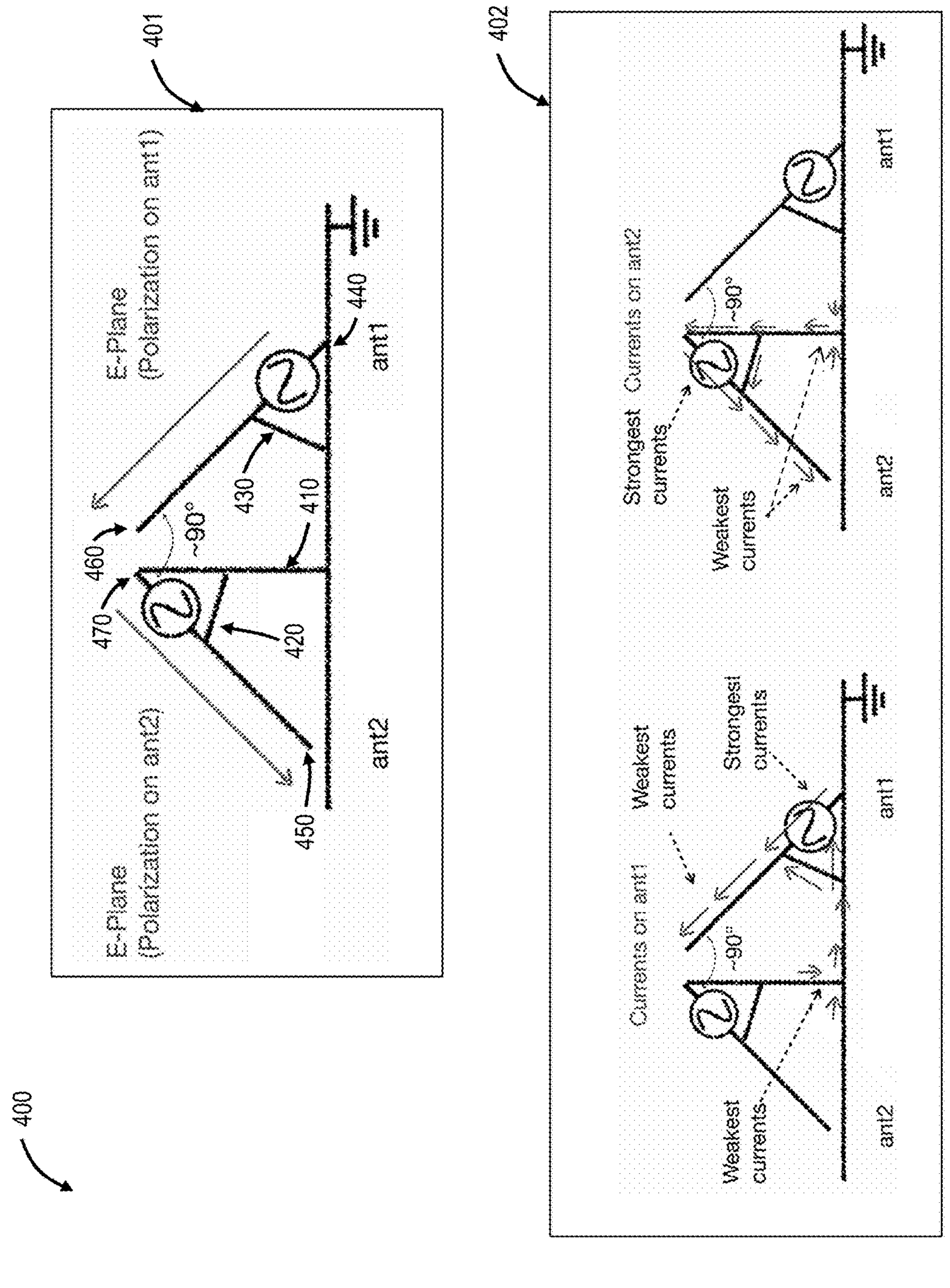
FIG. 4 is a circuit diagram of the 45-45-90-degree triangle arrangement antenna showing E-field and current paths on the arrangement.

FIG. 4 are circuit diagrams for the 45-45-90-degree antenna arrangement further detailing E-field and current paths on ant1 and ant2 400. Note, those skilled in the art will recognize that the antennas and grounds are shown in straight lines on a 2-dimensional plane, however different configurations, arrangements, thicknesses and shapes can be used for antenna design that is represented here as straight lines. Referring to 401, ant2 requires a vertical ground leg 410 to support the antenna feed on ant2. As depicted in the circuit diagram 401, ant 1 and ant 2 have capacitive coupling with the ground 440, although not parallel with the ground like the IFA/PIFA arrangement an inductance in the form of a shorting connection (short pin) (420, 430) to counter the capacitance between the antenna elements (ant1 and/or ant2) and ground 440 may be required depending on the amount of capacitance between the elements and ground. It should be noted from this illustration that the antennas are coupled via two paths:

a. Over the air coupling to the electric and magnetic fields
   i. In the antenna pair system shown (401) the antennas are oriented at approximately a 90-degree angle to one another, this provides for orthogonally polarized antennas. The polarization of an antenna is the direction of the electromagnetic fields produced by the antenna as energy radiates away from it. The electric field or E-plane lines on 401 details the polarization of the radio wave on each antenna. Orthogonally polarized antennas contribute to polarization diversity where the antennas have very little to no coupling even though they are closely located to one another. The strongest electric and magnetic fields on ant1 and ant2 are at the tip of their antenna elements (at 450 for ant2 and at 460 for ant1). Ant2 gets excited from the tip of the vertical ground leg 470, while ant1 is excited from the horizontal ground leg 440, being excited this way provides distance between the strongest E-fields associated with the antennas. If the feed from ant2 was on the opposite side (from the horizontal ground leg) and the tip of ant1 and ant2 were at a location closer to one another, it would result in increased coupling based on the directions of the E-plane.

b. Thru currents flowing on the common ground
   i. Antennas have two complementary functions, converting electromagnetic waves into voltage and current used by a circuit, and converting voltage and current into electromagnetic waves which are transmitted. When current flows it produces an electromagnetic field to the conductor the current flows in. The circuit diagrams shown in 402 depict how currents flow through both antennas ant1 and ant2. In the antenna pair system shown 402 the common ground current is split into two paths (horizontal and vertical), stated another way, the majority of the current on ant1 is pulled from the horizontal ground to the antenna and the majority of the current on ant2 is pulled from the vertical ground to the antenna. The direction of current flow on the surface of the antennas in the directions shown reduces the mutual coupling via ground currents that cause an opposing electromagnetic field between the two antennas. Regarding ant1 some currents are seen in the vertical ground leg, but those currents are much smaller than the currents being pulled from the horizontal ground leg. The same applies to ant2 where the strongest currents are being pulled from the vertical ground leg, where much smaller (weaker) currents are being pulled from the horizontal ground leg. It should be noted that the vertical ground plays a key role in reducing the coupling between ant1 and ant2. If this triangle arrangement is compared to the monopole arrangement in FIG. 1, the monopole arrangement has a shared horizontal ground plane 130 where the two monopole antennas are pulling currents from the same ground source, thereby contributing to high coupling. In the 45-45-90 degree arrangement shown, having a vertical and horizontal ground plane separates the currents being pulled by each antenna such that majority of the current for ant2 will be pulled from the vertical ground and majority of the current for ant1 will be pulled from the horizontal ground thereby reducing mutual coupling. In order to ensure current flows in the way shown on 402 the vertical ground 410 will be physically localized near ant2, and the horizontal ground 440 will be localized near ant1.

Figure 5:
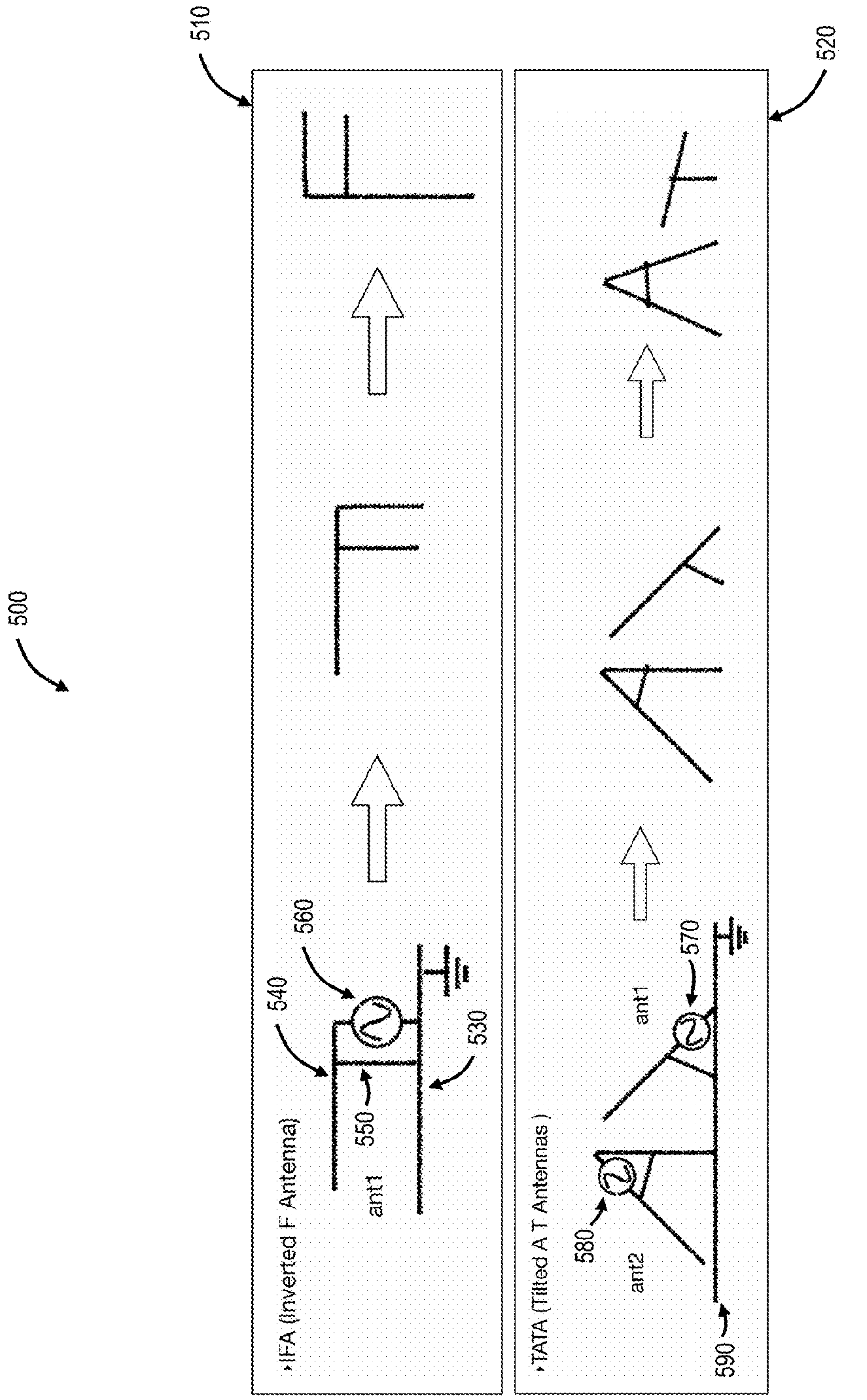
FIG. 5 illustrates a comparison between the geometry of the Inverted F antenna and the antenna geometry of the 45-45-90-degree antenna.

FIG. 5 illustrates a comparison between the geometry of the Inverted F antenna and the Antenna geometry of the 45-45-90-degree antenna described in the claims. The industry nomenclature that is used to describe the Inverted F shown in 510 is based on the geometric shape of the antenna system in relation to the horizontal ground plane 530. By illustrating this geometry by removing the horizontal ground plane 530 and removing the antenna feed 560, the elements that are left are the bent antenna 540 and the shorting connection (short pin) (inductance) 550 which represent a clockwise rotated letter F. Using the same methodology for the 45-45-90-degree antenna 520 described in the claims, removing the horizontal ground plane 590 and the antenna feeds for both antennas 570,580 the geometry represents a Tilted A T Antenna (TATA) as the antenna closely represents the letter A and letter T that is tilted slightly.

TATA Antenna Plate and Antenna Element Implementation

Figure 6:
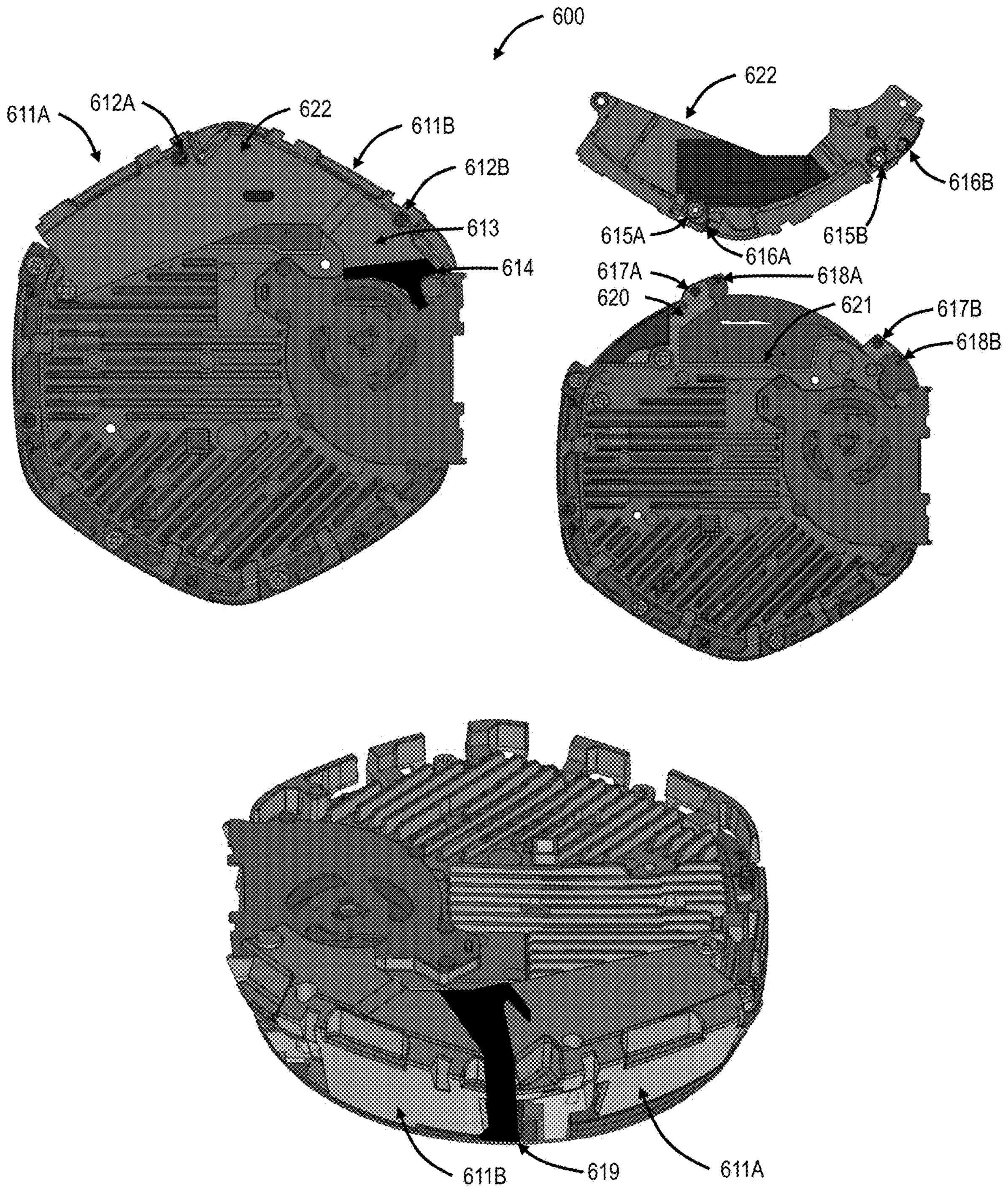
FIG. 6 illustrates multiple plan views of a wireless device with a small form two antenna TATA implementation.

FIG. 6 illustrates multiple plan views of a wireless device with the small form TATA design implemented within the device 600. The ant 1 and ant2 from FIG. 4 are shown implemented into this wireless device. The two antenna elements, ant1 (611B) and ant2 (611A) are integrally formed with the antenna plate and are also shown approximately 45-degree angles in relation to the horizontal ground plane 621 and 90 degree angles to one another. The details of the antenna trace is not shown as those can be modified during fabrication of the antennas to meet the geometry required of the small form device and still maintain the antenna configuration as described in the claims. The multiple views show the antenna plate 622 installed on the top left view and antenna plate removed (top right view) where the underside of the antenna plate is shown. The vertical ground 620 associated with ant2 (611A) is shown with a slight bend but is still orthogonal to the horizontal ground plane 621. The antenna ground short pin connection for ant2 is shown on 617A and the antenna feed is shown on 618A located closely to the short pin 617A. Similarly, ant1 short pin ground connection is shown on 617B and ant1 feed is shown on 618B. The ground pin for ant2 612A and ant1 612B are shown by a screw connection on the top of the antenna plate. The grounds are further shown on 615A and 615B on the underside of the antenna plate assembly which connect to the antenna grounds 617A and 617B via the ground screws 612A and 612B. These two antennas (ant1 and ant2) each have their respective grounds separated in order to pull current to drive the antenna, thereby reducing the current coupling between the two antennas. The antenna element pattern 613 is integrally formed with the other antenna elements and 614 shows the plastic antenna carrier which provides rigidity to the antenna system. The antenna feeds are further shown placed on the antenna plate assembly as shown on 616A for ant2 and 616B for ant1 and on the housing of the wireless device as shown on 618A and 618B. The two antennas 611A and 611B are separated by an area as shown on 619, the separation for the TATA type is approximately λ/60 (See FIG. 3) or approximately 6 mm for 4G/LTE antenna system (700 MHz). The TATA type antenna allows both cellular antennas to be located on the same side of the wireless device and allows the device to have other space allocated for wi-fi antennas or the like.

RF Blocking Objects and RF Transparency

Figure 7:
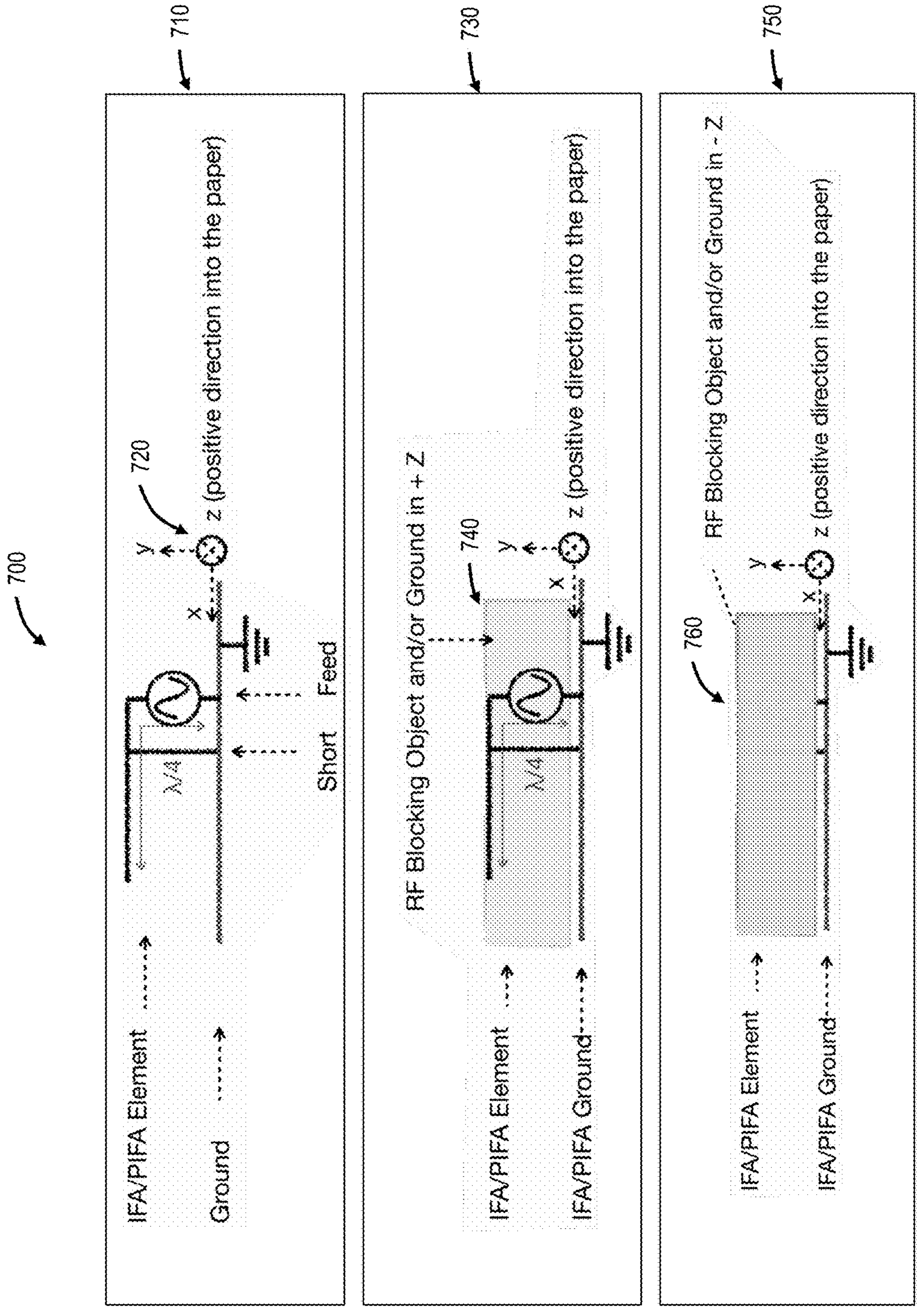
FIG. 7 illustrates radiofrequency (RF) blocking background and problems for an IFA/PIFA arrangement.

FIG. 7 illustrates radiofrequency (RF) blocking background and problems for a typical IFA/PIFA arrangement 700. When designing antennas as part of a small form device, the small form device can include other devices and elements that contribute to blocking the radiofrequency (RF). As can be seen in the circuit diagram 710, and visualizing the 2-dimension diagram as 3-dimensional (x,y,z) with the positive z direction shown into the paper, the only RF blocking objects and/or ground is in the negative y direction (720) which is the only efficiency limiting factor. Antenna efficiency is the ratio of power delivered to the antenna relative to the power radiated from the antenna and is affected by elements that block RF or by the antenna ground. The effect of RF blocking objects on the antennas and the RF noise that is produced from those objects can be mitigated by providing ample space between the antenna and the RF blocking object, however when designing antennas in a small form device providing the necessary space between the RF blocking device and the antennas is not an option. In a small form device RF blocking objects can exist in the positive z (730) and the negative z (750) direction (illustrated as a shaded rectangle 740 and 760) and represent an object such as a PCB which has multiple conductive elements and copper traces. These RF blockers in the form of printed circuit boards (PCBs) exist in small form devices where the TATA design and implementation would be beneficial because of the reduced antenna separation and area. In these small form designs the RF blocking PCB elements could be as close as approximately λ/80 between the antenna and the PCB when designing antennas at the lowest frequency of operation of 700 MHz.

Figure 8:
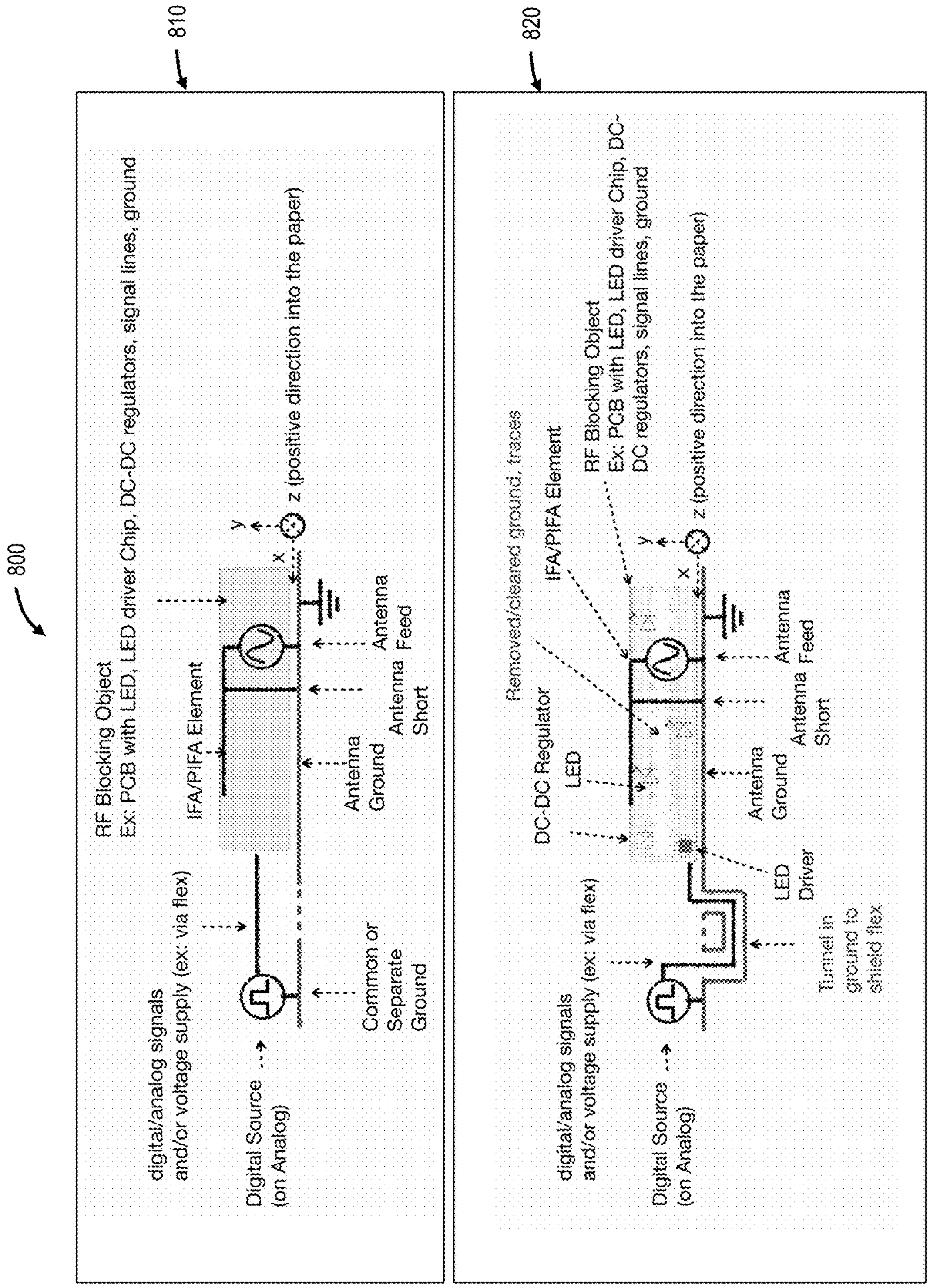
FIG. 8 is a circuit diagram showing a PCB radiofrequency (RF) blocking object problem and solution on an IFA/PIFA arrangement.

FIG. 8 is a circuit diagram showing a PCB radiofrequency (RF) blocking object on an IFA/PIFA arrangement 800. Referring to the top diagram 810, a PCB RF blocking object is placed close to an antenna in the positive z direction as illustrated as the gray rectangle, and can include but not limited to a plurality of LED, LED driver chip, DC-DC regulators, signal lines, ground, etc. Also shown on this circuit diagram 810 is the presence of digital/analog signals and/or a voltage supply which would be included as a necessary element to supply power and control the LED PCB. These blocking objects will degrade antenna efficiency as it is in close proximity to the IFA/PIFA element 810. The lower circuit diagram 820 shows the same IFA/PIFA arrangement with modifications in order to alleviate the degradation of efficiency compared to 810. The steps in this disclosure to alleviate the degradation of antenna efficiency from a PCB blocking object and as a result reduce RF noise are as follows:

a. Removing all grounds from the RF blocking object and keeping only necessary signal lines and power supply lines. This would increase antenna efficiency as the conductive elements contribute to RF blocking, therefore removal of these conductive elements on the PCB contributes to the PCB becoming semi-RF transparent. On 820 the RF blocking object is shown more transparent than the RF object shown in 810, this represents the removed grounds and copper PCB traces. It should be noted that RF can penetrate nonconducting materials much better than conducting materials, however RF transparent materials are materials where RF fields can penetrate with no heating occurring and in turn less efficiency loss. RF transparent materials include but are not limited to ceramics and plastics. However, removing grounds exposes noise to the antenna which degrades active receiver sensitivity of the antenna. Receiver sensitivity is a measure of the minimum signal strength that a receiver can detect.

b. In addition to creating a more RF transparent blocking object, the flex PCB between the digital/analog source and the RF blocking object can be routed through a grounded cavity to shield it from radiation and prevent coupling. The grounded cavity will isolate and shield the flex PCB which is used for digital/analog signals and voltage supply to the LED PCB and reduce the coupling of radio waves, electromagnetic fields and electrostatic fields.

Figure 9:
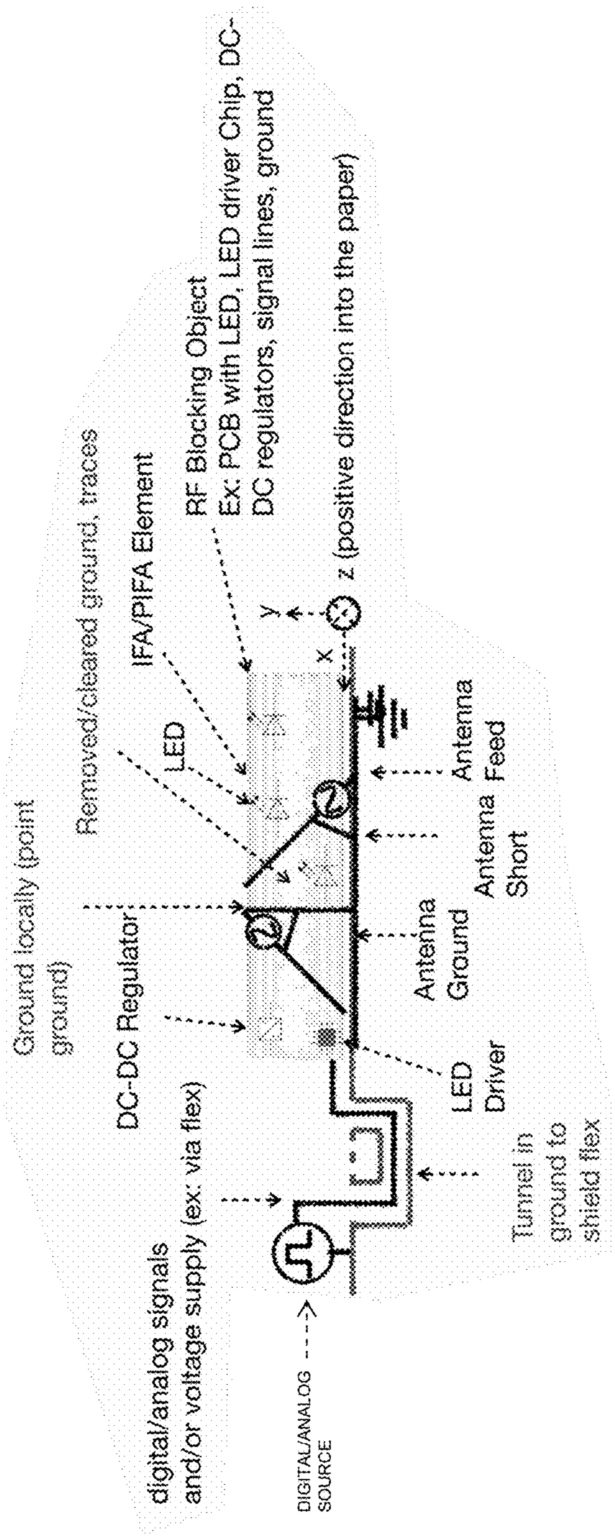
FIG. 9 is a circuit diagram showing a RF blocking object and RF transparency solution on a Tilted A T Antenna (TATA) arrangement.

FIG. 9 is a circuit diagram showing a RF blocking object on a Tilted A T Antenna (TATA) arrangement 900 in the positive z direction. The RF blocking elements are represented as a PCB with plurality of LED, LED driver chip, DC-DC regulators, signal lines, ground, etc, the same as those shown in FIG. 8. The same solution for alleviating the RF blocking problem from the IFA/PIFA arrangement in FIG. 8 apply with the TATA arrangement, in addition to those items since one of the antennas has a vertical ground which is not present in the IFA/PIFA, if that vertical ground is grounded locally (point ground) in regards to ant2 thru the LED PCB board it would keep the LED PCB and antenna at the same potential, enhance antenna radiated sensitivity, reduce the noise and reduction in antenna efficiency that was stated in the IFA/PIFA arrangement. Providing a vertical ground for one antenna that is locally grounded and a horizontal ground for the other antenna, where the two ground connections to the antennas are separated by a distance, wherein each antenna pulls current from different areas of the ground will reduce current coupling in both antennas.

Method(s) of Manufacturing the TATA Antenna and Implementing RF Transparency

Figure 10:
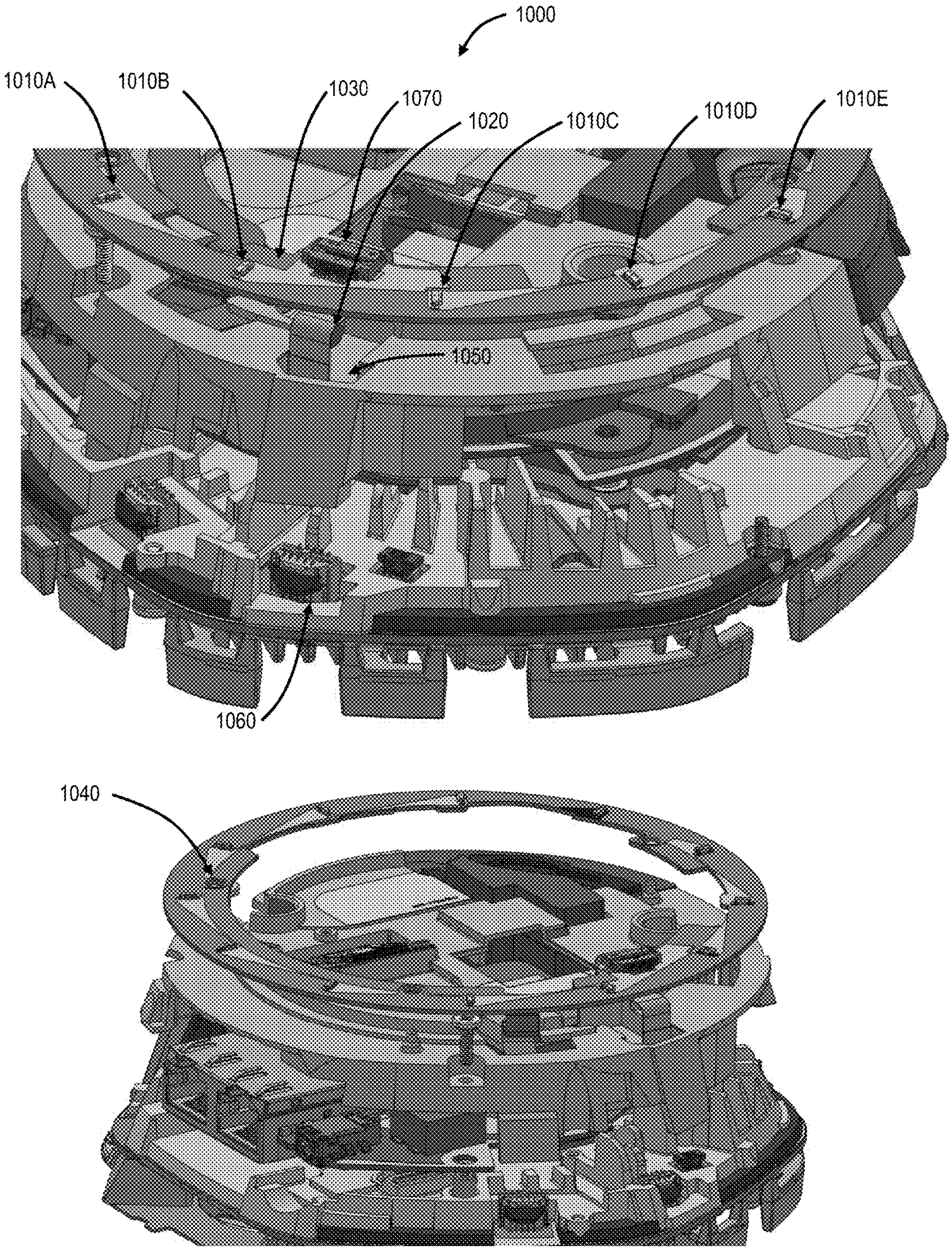
FIG. 10 is a perspective view of a small form three-dimensional wireless device further detailing RF blocking objects in proximity with TATA antenna system and detailing the flex PCB grounded cavity.

FIG. 10 is a perspective view of a small form three-dimensional wireless device 1000 further detailing RF blocking objects in close proximity with a TATA antenna system and detailing the flex PCB grounded cavity 1050. The upper and lower views of the wireless device show the device upended compared to FIG. 6 and unassembled to further detail components that make up the wireless device. The upper view shows a portion of the wireless device which includes LED's (1010A-1010E) that are located around the perimeter of the LED PCB (1030). These LED's are mounted integral with the PCB and also include LED driver chip, copper traces, grounds and other components that contribute to RF blocking. Referring to the lower view 1040 depicts where the vertical ground leg of the TATA ant2 will be grounded (point ground) to the LED PCB as described in the present disclosure. The flex PCB is shown in 1020, as described in the present disclosure the flex PCB is routed through a grounded cavity or tunnel 1050 in order to provide RF shielding and reduce interference with the TATA antenna. The flex PCB is routed in the grounded cavity between the RF Board connecter 1060 and the LED driver chip 1070. The flex PCB can be used for the power supply and digital/analog signals between the source and the LED PCB. The flex PCB can be multi-layer, single, or double sided.

Figure 11:
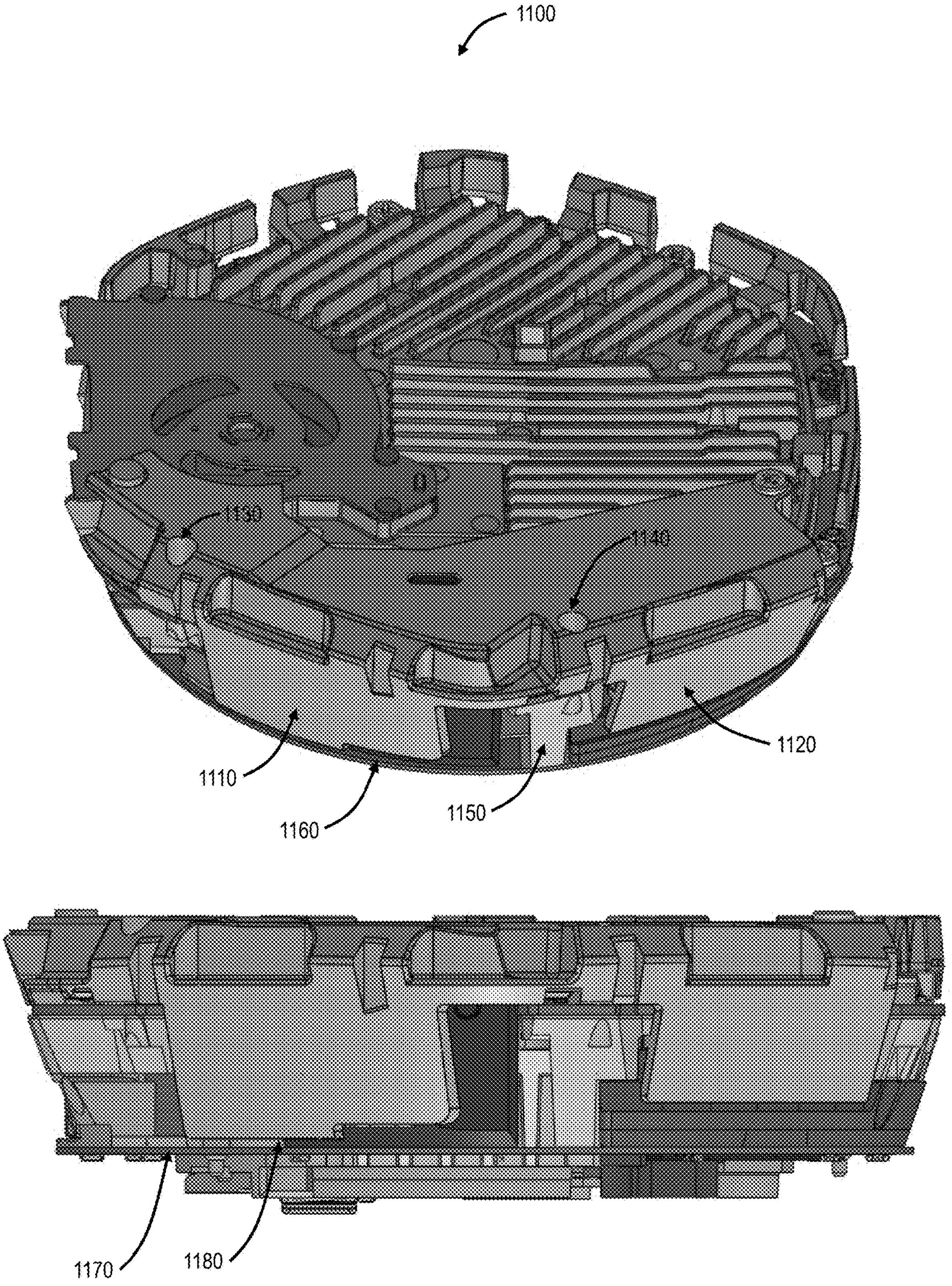
FIG. 11 is a perspective view of the small form wireless device assembled depicting the elements of the present disclosure.

FIG. 11 is a perspective view of the small form wireless device showing elements of the present disclosure 1100. Referring to the upper plan antenna ant1 (1110) and the associated ground plane are formed partially by a ground screw, spring clip, or spring pin (1130). The same is shown for antenna ant2 (1120) and the ground pin (1140). The separation between antenna ant1 and antenna ant2 is not shown on this diagram but is part of the TATA antenna design and is shown on 619. Antenna ant2 (1120) gets excited from the tip of the vertical ground leg (1150) while antenna ant1 (1110) is excited from the horizontal ground leg 621, which is located underneath the ground plate 622. The vertical ground shown (1150) is also shown at a different angled view with the antenna pate removed (620). It should be noted that the vertical ground as shown in the circuit diagram (401) as a vertical line is implemented as a 3-dimensional ground which has length, width, and depth aspects to the design but is implemented at a 90-degree angle to the horizontal ground leg. The vertical ground leg has a local point ground that connects antenna ant2 and the LED PCB (1160 and 1170) which serves to keep the LED PCB at the same potential and alleviates noise issues that may occur from implementing a RF transparent PCB. The separation (1180) between the LED PCB (1160,1170) and antenna ant1 (1110) is shown, the LED PCB acts as an RF blocking object located near the antenna, however by making the LED PCB RF transparent by removing grounds and signal lines that aren't absolutely necessary the separation is reduced to approximately $\lambda/80$ separation at the lowest frequency of operation of 700 MHz. It should be noted that the lower the operating frequency of the antenna, the more separation that is needed, therefore this solution can be applied to antennas that operate at the lower cellular operating frequencies. This RF blocking parameters are further described as a circuit diagram in FIG. 7.

Figure 12:
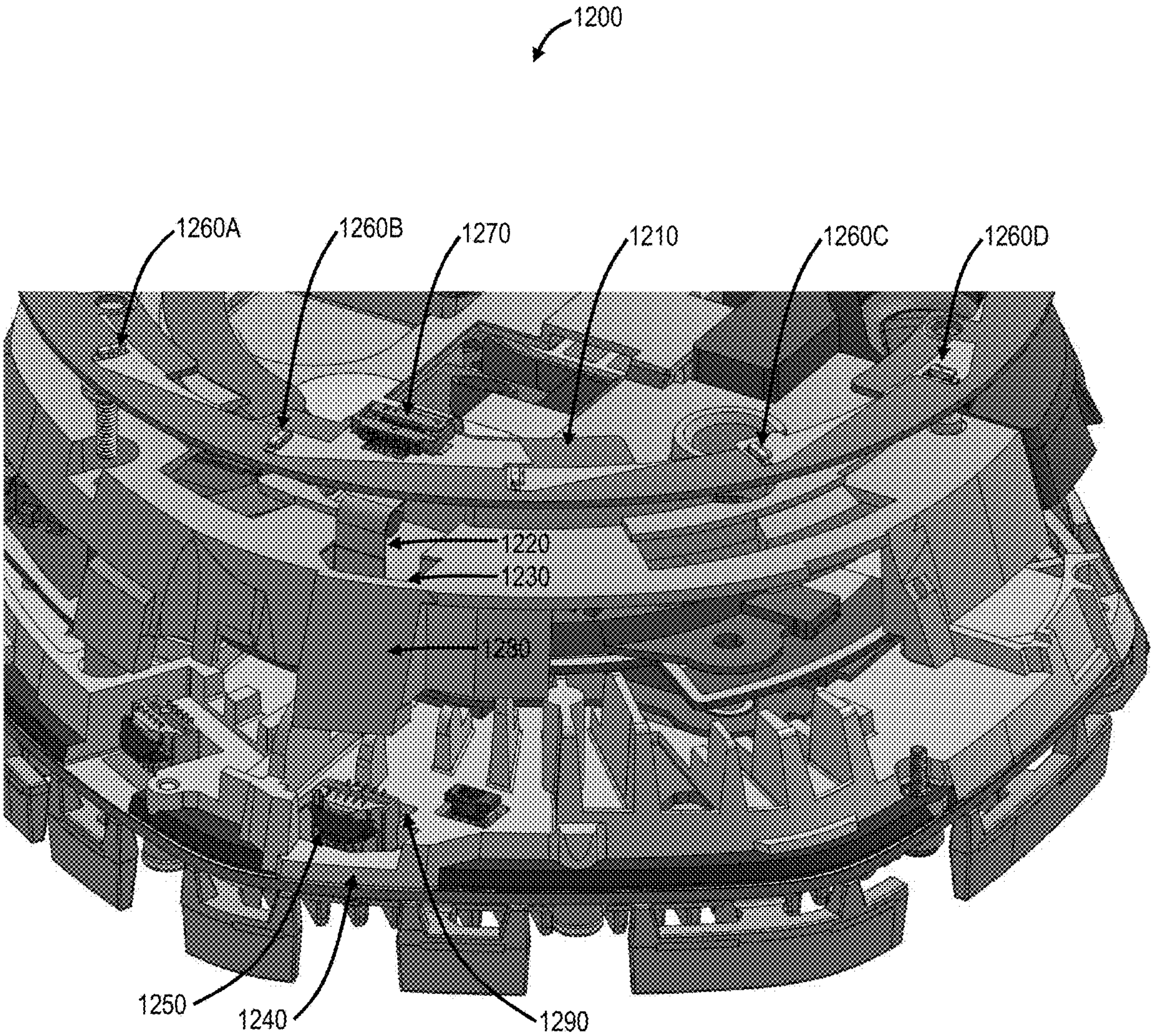
FIG. 12 is a perspective view of the small form wireless device further detailing ground tunnel/cavity shielding elements of the present disclosure.

FIG. 12 is a perspective view of the small form wireless device further detailing ground tunnel/cavity elements of the present disclosure. This view shows the wireless device in FIG. 11 upended with elements segmented in order to detail the LED PCB 1210 with individual LED's (1260A-1260D) surrounding the LED PCB and the flex PCB. It should be observed that the LED PCB board represented here can include any combination or arrangement of RF blocking devices, the represented LED PCB board is showing one of many types of RF blocking devices that can be located in close proximity to the TATA antennas. The flex PCB 1220 that connects the RF Board 1250 to the LED PCB board 1270 is shown routed inside a grounded tunnel or cavity 1230. This grounded cavity provides RF shielding to choke out any noise or interference that can be transmitted to the antennas. The flex PCB is used to provide power from the RF board to the LED PCB and also can contains signals (digital and analog) for communication between the RF board and the LED PCB Board. The flex PCB tunnel is formed by the bottom-heat spreader 1280 located near the LED PCB portion of the flex PCB, and closer to the RF board there exists a mid-heat spreader 1240 which acts as a heat sink in addition to a ground to form the tunnel. The mid-heat spreader on one side and the wireless device casing on the other form a tunnel closer to the RF board as can be observed on 1290. The grounded tunnel or cavity can be formed by any number of grounded elements that make up the wireless device.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A compact electronic device comprising:

a housing;

circuitry; and a first antenna and a second antenna connected to the circuitry and contained in the housing, the first antenna being connected at a proximal end to a grounding plate, the second antenna being connected at a proximal end to the grounding plate, the first antenna and the second antenna being angled relative to one another, such that a distal end of each of the first antenna and the second antenna are physically spaced closer to each other than the proximal ends of the first antenna and the second antenna; wherein the first antenna and the second antenna are each located on adjacent sides of the housing from one another, and further comprising one or more additional antennas located on opposite sides of the housing from the adjacent sides.

2. The compact electronic device of claim 1, wherein positioning of the first antenna and the second antenna causes ground plane connections to be electrically far apart.

3. The compact electronic device of claim 1, wherein the first antenna and the second antenna are driven in from alternating ends causing a high field portion of one antenna to be close to a drive/high current portion of the other antenna, thereby providing high separation of the two high field areas and two high current areas.

4. The compact electronic device of claim 1, wherein one or both of the first antenna and the second antenna have a shorting connection to cancel extra capacitance.

5. The compact electronic device of claim 1, wherein the first antenna and the second antenna have an antenna structure similar to an Inverted F Antenna (IFA) or a Planar Inverted F Antenna (PIFA).

6. The compact electronic device of claim 1, wherein one or more of the first antenna and the second antenna have a multidimensional structure.

7. The compact electronic device of claim 1, wherein the first antenna and the second antenna are each fed via a spring pin.

8. The compact electronic device of claim 1, wherein the first antenna and the second antenna each include a ground pin formed by any of a screw, spring clip, and spring pin.

9. The compact electronic device of claim 1, wherein the circuitry is on a printed circuit board having a ground plane removed in part to allow radiation from the first antenna and the second antenna.

10. The compact electronic device of claim 1, wherein the circuitry is on a printed circuit board that utilizes the ground planes.

11. The compact electronic device of claim 1, wherein the first antenna and the second antenna are cellular antennas and the one or more additional antennas are for any of Wi-Fi and Bluetooth.

12. A compact electronic device formed by a process comprising steps of:

forming a first antenna and a second antenna;

connecting the first antenna and the second antenna to circuitry;

connecting the first antenna and the second antenna to a ground plane; and placing the first antenna and the second antenna and the circuitry in a housing, such that each of the first antenna and the second antenna are angled relative to one another with one end of each spaced physically close and another end of each connected to the ground, wherein the first antenna and the second antenna are each located on adjacent sides of the housing from one another, and further comprising one or more additional antennas located on opposite sides of the housing from the adjacent sides.

13. The compact electronic device of claim 12, wherein positioning of the first antenna and the second antenna causes ground plane connections to be electrically far apart.

14. The compact electronic device of claim 12, wherein the first antenna and the second antenna are driven in from alternating ends causing a high field portion of one antenna to be close to a drive/high current portion of the other antenna, thereby providing high separation of the two high field areas and two high current areas.

15. The compact electronic device of claim 12, wherein one or both the first antenna and the second antenna have a shorting connection to cancel extra capacitance.

16. The compact electronic device of claim 12, wherein the first antenna and the second antenna have an antenna structure similar to an Inverted F Antenna (IFA) or a Planar Inverted F Antenna (PIFA).

17. The compact electronic device of claim 12, wherein one or more of the first antenna and the second antenna have a multidimensional structure.

18. The compact electronic device of claim 12, wherein the first antenna and the second antenna are cellular antennas and the one or more additional antennas are for any of Wi-Fi and Bluetooth.

* * * * *